United States Patent [19]

Temple

[11] Patent Number: 5,454,434
[45] Date of Patent: Oct. 3, 1995

[54] AGRICULTURAL PLOUGH

[76] Inventor: Peter D. Temple, Caldecote Manor Farm, Abbotsley, St. Neots, Cambs PE19 4Xq, United Kingdom

[21] Appl. No.: 117,031
[22] PCT Filed: Mar. 6, 1992
[86] PCT No.: PCT/GB92/00398
  § 371 Date: Aug. 31, 1993
  § 102(e) Date: Aug. 31, 1993
[87] PCT Pub. No.: WO92/17050
  PCT Pub. Date: Oct. 15, 1992

[30] Foreign Application Priority Data

Apr. 5, 1991 [GB] United Kingdom .................... 9107315
Sep. 13, 1991 [GB] United Kingdom .................... 9119635

[51] Int. Cl.$^6$ .............................. A01B 3/28; A01B 5/08; A01B 5/14
[52] U.S. Cl. .......................................... 172/219; 172/221
[58] Field of Search ................................ 172/209, 210, 172/218, 219, 220, 221, 222, 224, 161, 167, 196

[56] References Cited

U.S. PATENT DOCUMENTS

| | | | |
|---|---|---|---|
| 735,506 | 8/1903 | Hatcher | 172/167 X |
| 987,477 | 3/1911 | McKay | 172/221 X |
| 1,708,297 | 4/1929 | Hansmann et al. | |
| 3,101,789 | 8/1963 | Jennings | |
| 3,212,587 | 10/1965 | Thompson | |
| 4,687,065 | 8/1982 | Cope et al. | 172/167 |

FOREIGN PATENT DOCUMENTS

| | | |
|---|---|---|
| 214856 | 5/1958 | Australia . |
| 61937 | 9/1971 | Australia . |
| 1118518 | 6/1956 | France . |
| 2641664 | 7/1990 | France . |
| 1003485 | 2/1957 | Germany . |
| 3720334 | 1/1988 | Germany .............................. 172/218 |
| 2012152A | 7/1979 | United Kingdom . |
| 2137461A | 10/1984 | United Kingdom . |

Primary Examiner—Randolph A. Reese
Assistant Examiner—Frederick L. Lagman
Attorney, Agent, or Firm—Harness, Dickey & Pierce

[57] ABSTRACT

An agricultural plough comprising a frame beam adapted to be inclined relative to the direction of ploughing, and a plurality of tilling apparatus respectively connected to the beam by pivot connections, the pivot axis of each such pivot connection extending in front of the leading part of the tilling apparatus towed from such pivot connection. Each tilling apparatus comprising a rotary tilling implement in the form of a plough disc or soil inversion wheel with the tilling implement being mounted for rotation about a substantially horizontal shaft which itself is pivotable about its end remote from the tilling implement for reversing the inclination of the tilling implement relative to the direction of travel for changing the arrangement between right- and left-hand ploughing. Preferably, the axis of the pivot connection from the beam to the tilling apparatus is inclined to the vertical in order to extend downwardly and forwardly away from the plough.

6 Claims, 4 Drawing Sheets

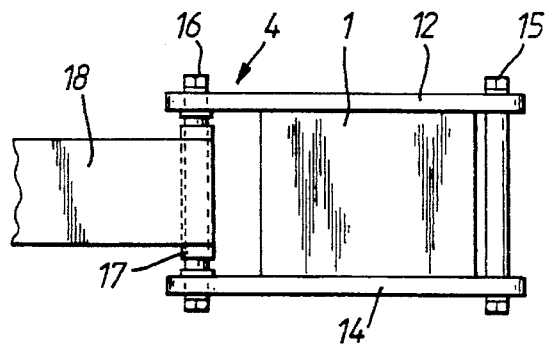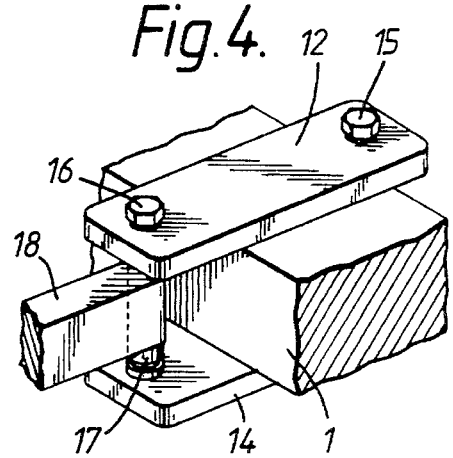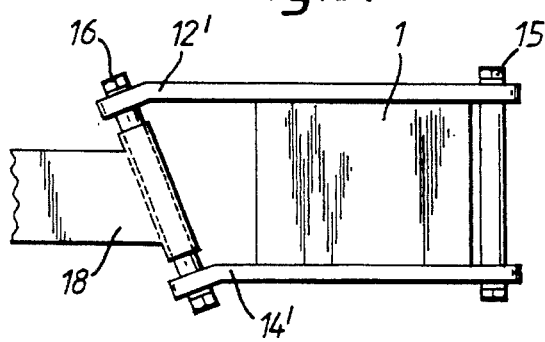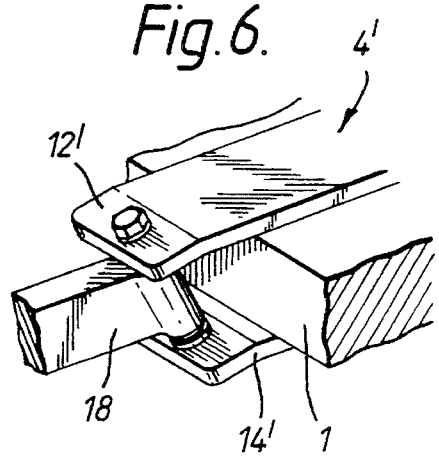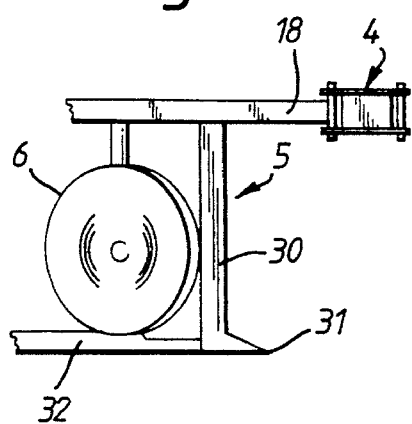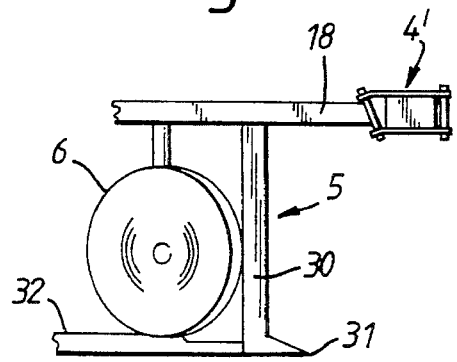

AGRICULTURAL PLOUGH

This invention relates to an improved agricultural plough.

There is a need for improving ground preparation equipment for ploughing and the present invention is more especially concerned with those ploughs which use rotary tilling implements such as a plough disc or soil inversion wheel. Ploughing is commonly carried out using an appliance comprising one or more tilling apparatus secured rigidly by a clasp or other means to a carriage or frame of the plough. The plough body shanks are normally so-arranged that the lower pointed extremities of the tilling apparatus bodies are displaced towards the front of the appliance. In use, with the appliance trailed behind an agricultural vehicle such as a tractor, the ploughing elements penetrate the soil to be ploughed and are drawn through the soil to initiate an inversion or turning over of the soil. During such operations, soil irregularities, such as large consolidated clods and large flints and boulders are frequently encountered by the plough bodies and place lateral stress on the bodies, commonly resulting in bending or breaking of the bodies with consequent need for repairs to be carried out. A plough frame often has a reversing mechanism to enable efficient field procedure so that the plough can be used to produce both right- and left-hand furrows. Also, a variable width system may be provided to vary the width of the furrows as required. These prior structures are complex, often clumsy, and expensive to manufacture.

An aim of the present invention is to provide an agricultural plough which does not suffer from the disadvantages discussed above.

According to the present invention, there is provided an agricultural plough comprising a frame having a first portion adapted to be drawn by or mounted to a tractor and a second portion comprising a beam pivotally connected to the first portion so as to be alternatively pivotally positionable for left- and right-hand ploughing, and a plurality of tilling apparatus respectively connected to the beam by pivot connections, each tilling apparatus comprising a rotary tilling implement and a point for penetrating the soil forwardly of the leading edge of the tilling element, the rotary tilling element being in the form of a plough disc or soil inversion wheel with the tilling implement being mounted for rotation about a substantially horizontal shaft which itself is pivotable about its end remote from the tilling element for reversing the inclination of the tilling element relative to the direction of travel for changing the arrangement between right- and left-hand ploughing.

Preferably, the pivot axis of each said pivot connection extends in front of the leading part of the tilling apparatus towed from such pivot connection. The axis of the pivot connection from the beam to the tilling apparatus, in use, extends downwardly either square to, or at an acute angle, to the ground so as to pass in front of the foremost part of the leading point of the tilling apparatus.

In use of the plough, with a landslide extending from each point to the rear of the associated implement, when the frame beam is pulled behind the tractor or the like the rotary plough will normally trail automatically, being aligned parallel with the direction of forward travel by the stabilising effect of the landslide. However, the trailing action can create lateral stresses whilst ploughing when the plough comes up against obstructions in the ground. The pivot connection from the beam allows lateral displacement of the tilling apparatus which prevents stress or breakage.

The width of furrows can readily be controlled by simply adjusting, as by variably positionable stops, the angle of inclination of the beam to the direction of forward movement.

The invention will be further described, by way of example, with reference to the accompanying drawings, in which:

FIG. 3 is a side view showing a pivotal coupling for attaching a tilling apparatus to a cross-beam;

FIG. 4 is a perspective view of the pivotal coupling of FIG. 3;

FIG. 5 is a view similar to FIG. 3 but showing an alternative coupling with inclined pivotal axis;

FIG. 6 is a perspective view of the coupling of FIG. 5;

FIG. 7 is a diagrammatic side view of tilling apparatus connected to the coupling of FIG. 3;

FIG. 8 is a diagrammatic side view of tilling apparatus attached to the coupling of FIG. 5;

Figure 1:
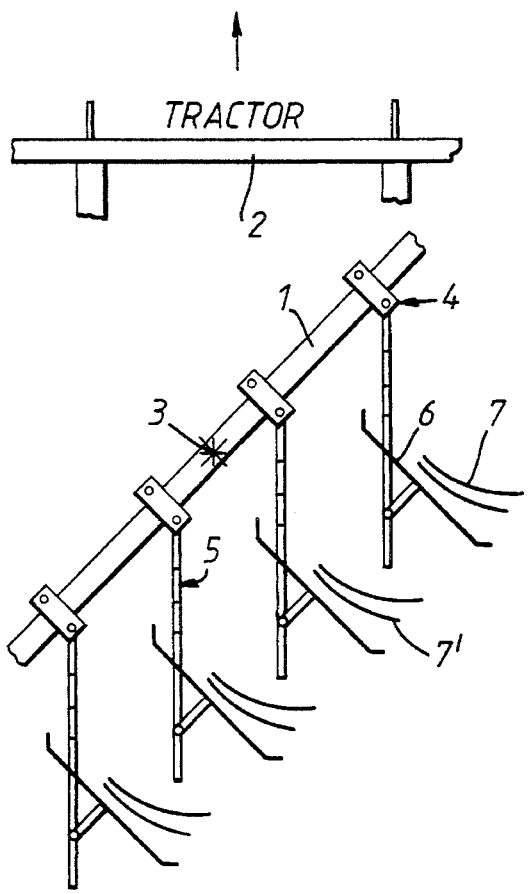
FIGS. 1 and 2 are diagrammatic plan illustrations of a plough embodying the invention with FIG. 1 showing the plough arranged for right-hand ploughing and FIG. 2 showing the alternative arrangement for left-hand ploughing.

Referring to the drawings, FIG. 1 shows part 2 of a tractor being used to draw a plough comprising a cross-frame beam 1. The beam 1 is connected by a pivot 3 to the tractor 2. A plurality of tilling apparatus 5 are drawn from the beam 1 with each tilling apparatus being pivotally attached to the beam 1 by a pivotal connector 4.

As illustrated, each ploughing apparatus comprises a tilling element in the form of a soil inversion wheel 6 rotatable, when drawn through the soil, to till and turn over earth 7 or 7' to obtain successive parallel furrows. Due to the inclination of the beam 1, each succeeding tilling element inversion wheel 6 turns over the soil to fill a furrow dug by the preceding tilling element. Thus, the earth 7' shown in FIG. 1 will fill the furrow dug by removal of the earth 7. With this arrangement, stubble will be lifted and buried in the furrow with soil deposited on top thereof dug from the lower level by the succeeding tilling element.

Figure 2:
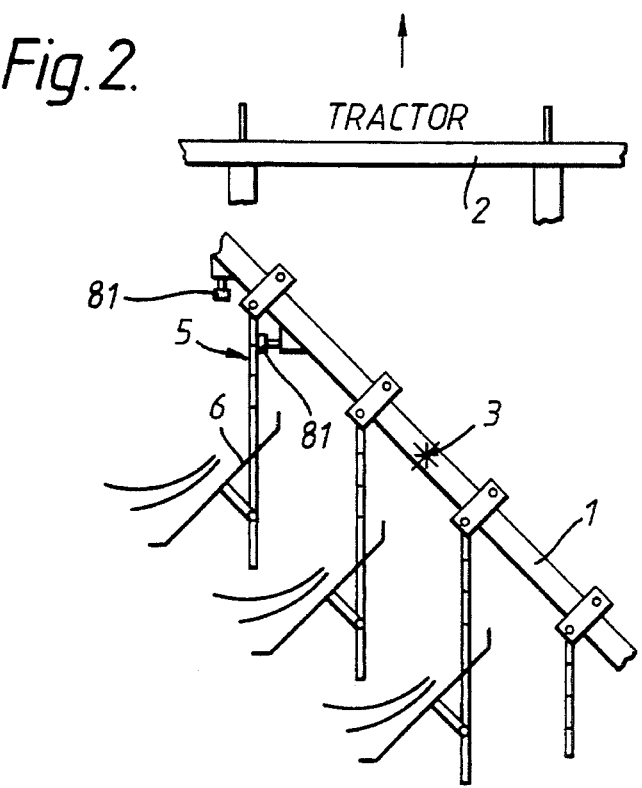

Each tilling element 6 is rotatable about a shaft which is pivotally attached to the drawn mounting frame so that in order to change from right- to left-hand ploughing, all that needs to be done is for the direction of inclination of the beam 1 about the pivot 3 to be reversed and for the tilling elements 6 to be swung around so as to face in the opposite direction as shown in FIG. 2. With this arrangement, the plough can be used to go back and forth across a field in a steady progressive ploughing action. The tilling apparatus will realign parallel with the forward direction of movement of the plough because of the effect of a point forwardly of the tilling element and a landslide extending rearwardly of said point. An exemplary construction of point and landslide is illustrated in FIGS. 7 and 8.

By changing the inclination of the beam 1, the widthwise separation of the furrows can be altered, depending upon the soil type and what is required in a particular tilling operation. With the arrangement as shown, with the foremost part of the tilling apparatus behind the pivotal axis of the pivotal connector 4, the tilling apparatus can automatically become displaced slightly from side-to-side when coming across an obstruction so as to pass that obstruction more easily without substantial damage to the plough.

FIGS. 3 and 4 show a simple construction of pivot connection where clamping members 12 and 14 extend over and above the cross-beam 1 and are drawn into clamping engagement therewith by bolts 15 and 16. Arranged about the bolt 16 is a pivotal sleeve 17 which receives the forward end of tilling apparatus frame member 18. In the alternative embodiment shown in FIGS. 5 and 6, the plate members 12' and 14' are extended and inclined so as to provide an inclined pivotal axis for the frame member 18. As well as helping even further to ensure that the foremost part of the tilling apparatus is behind the line of the axis of pivotal connection, the inclined axis also has the advantage that when the tilling apparatus meets an obstruction and tends to be moved sideways, automatically it tends to move upwardly so as to assist further clearance of the obstruction due to the inclined pivotal axis.

Figure 10:
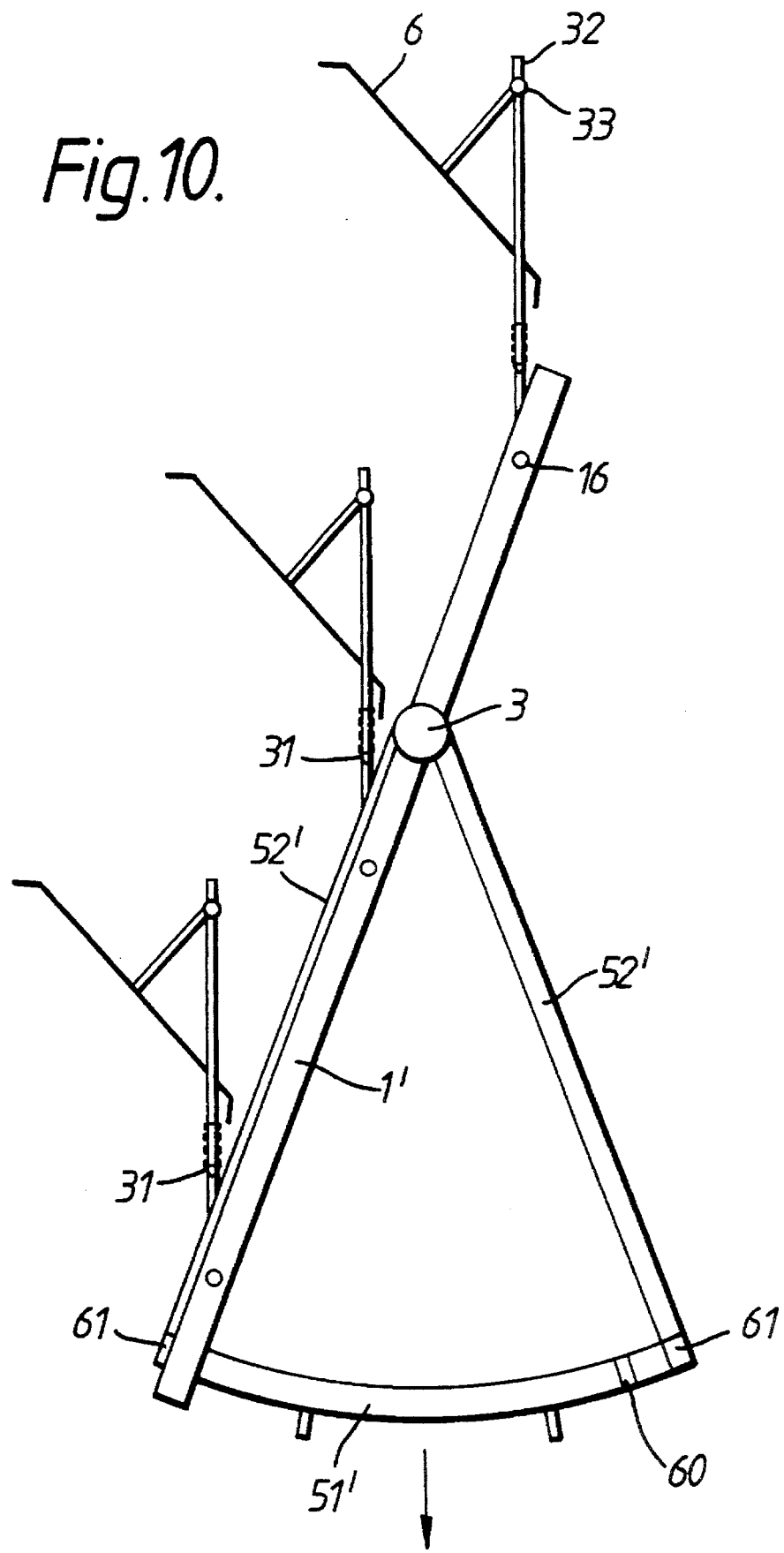
FIG. 10 is a diagrammatic plan view showing an alternative plough arrangement embodying the invention.

While the drawings show the preferred arrangement with the pivot connection trailing behind the beam 1, it is possible to put the pivot connection in connection with the beam 1 wherever most convenient. Thus, in some instances it may be preferred to put the pivot connection in front of the forward edge of the beam with the connection to the ploughing apparatus extending rearwardly either above or below the beam 1 as most convenient. However, in some embodiments, it may be desirable to have the pivot mounting 3 non-centrally arranged along the length of the beam 1 so that the ploughing behind the tractor can extend laterally from one side of the tractor. With such an arrangement, as illustrated in FIG. 10, in order to allow reversal of direction of ploughing, instead of the beam 1 simply having its direction of inclination varied from side-to-side, the beam will be rotated with its direction of extent passing through the longitudinal direction of ploughing.

FIG. 7 shows a typical tilling apparatus 5 which comprises a rotatable tilling implement 6 located behind a vertical frame member 30 extending downwardly from the frame member 18 and provided at its lower end with a forwardly extending point 31. Extending rearwardly from the point 31, beneath and to the rear of the rotatable tilling element 6, is a landslide 32 which assists in stabilising the movement of the tilling apparatus and maintaining its orientation parallel with the direction of forward movement of the plough.

FIG. 8 shows similar apparatus but here connected to a pivotal connector 4' with inclined axis instead of the pivotal connector 4 with the vertical axis.

Figure 9:
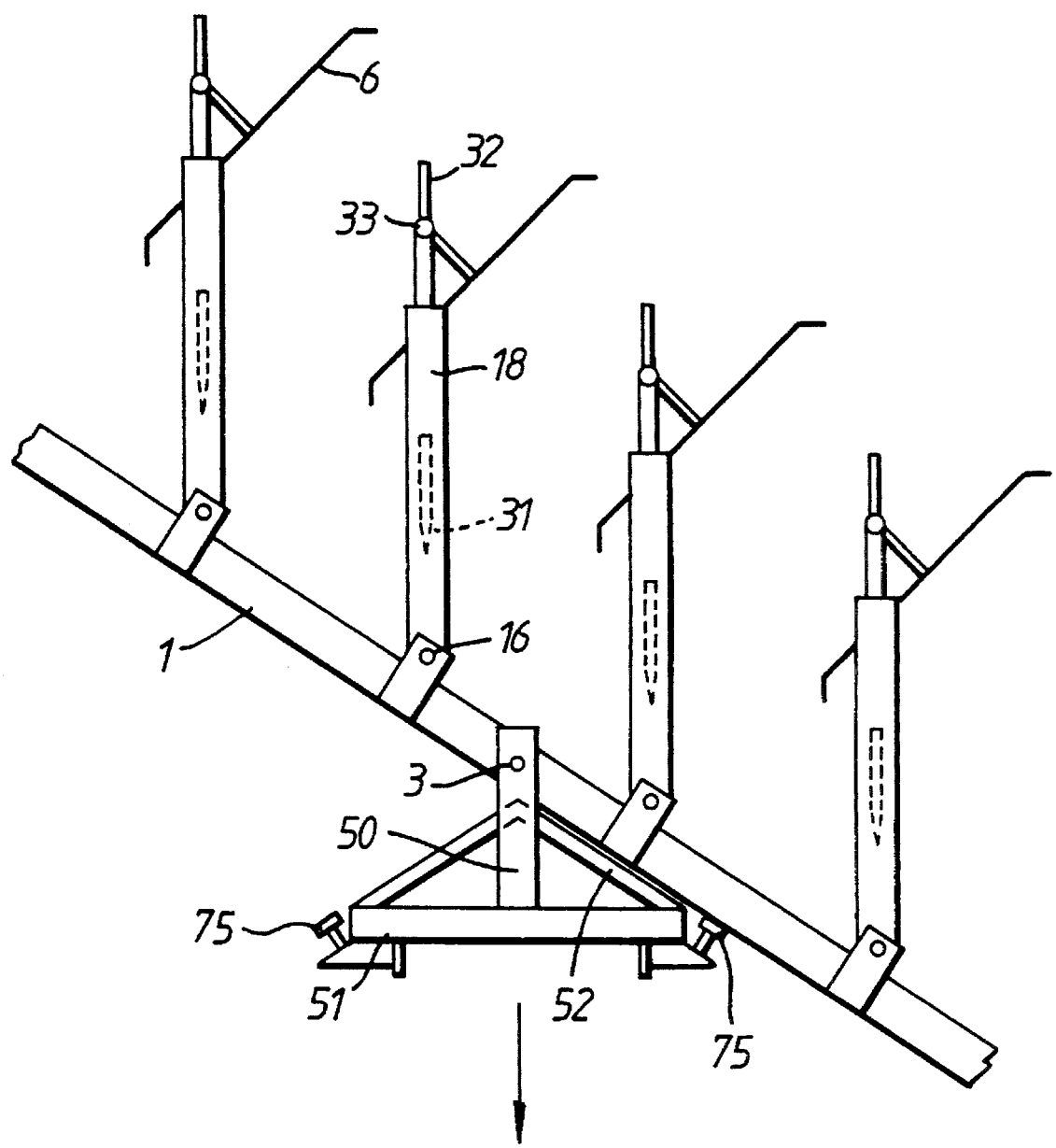
FIG. 9 is a view similar to FIG. 1 but including the frame portion of the plough to which the cross-beam portion is pivoted.

FIG. 9 illustrates a typical manner in which the plough frame can be formed in two portions with one portion being connectable to a tractor and the other portion comprising the inclined beam 1. As illustrated, the first portion comprises a cross-member 51 carrying a support member 3 to which the beam 1 is connected by the pivot connection 3. Diagonal bracing members 52 assist structurally to connect the members 50 and 51. Trailing from the pivot connection 16 to the beam 1 are shown tilling apparatus comprising the rotary inversion wheel 6 carried by the tilling apparatus frame member 18 and arranged above a landslide 32.

As illustrated in FIG. 9, the plough is arranged for left-hand ploughing so that as the plough is drawn over the ground the tilling inversion wheel implements 6 turn the soil to the left. In order to go back across the field with right-hand ploughing, all that needs to be done is for the beam 1 to be pivoted about the pivot 3 so as to be oppositely inclined to the direction of movement of the plough with the axis of rotation of the tilling element 6 similarly being pivoted about pivot mountings 33. If it is desired to be able to vary the spacing between adjacent furrows, means such as an adjustable stop 75 may be provided on the frame to permit the angle of inclination of the beam 1 relative to the first portion of the frame to be adjustable to permit variation of the angle of inclination of the beam 1. With such an arrangement, the more acute the angle of inclination of the beam 1 to the direction of motion, the less the separation between adjacent tilling apparatus and thus the smaller the width of the furrows.

In a less preferred method of control of the angle of the beam, instead of providing an adjustment between the beam 1 and the frame portion from which it is supported to limit pivotal movement of the beam, a stop, similarly adjustable to vary the furrow spacing, may be provided between one or more of the tilling apparatus and the beam 1 to limit pivotal movement of the tilling apparatus relative to the beam 1 for example, see adjustable stop 81 in FIG. 2. Because of the tendency of the tilling apparatus to move parallel with the direction of forward travel during ploughing, automatically the inclination of the beam 1 and the furrow width will be controlled due to the limitation on the pivotal movement on the tilling apparatus relative to the beam 1. With this operation, all that would need to be done when reversing the direction of inclination of the beam for changing between left- and right-hand ploughing, would be to reverse the direction of pivoting of the inversion wheels 6 about their axes 33 and to swing the tilling apparatus about their pivots 16 onto adjustable stops. Because of the tendency of the tilling apparatus to move parallel with the forward ploughing direction, the beam 1 will automatically maintain its correct orientation for the ploughing operation in accordance with the direction of travel.

Whilst FIG. 9 illustrates a simple arrangement having a simple rigid beam 1, it will be appreciated that, particularly for large ploughs, the beam 1 may have extensions either demountably secured to the ends thereof or capable of folding so as to provide wings to extend the width of ploughing with the apparatus itself being foldable or disassemblable for ready travel to and from the ploughing location.

FIG. 10 illustrates the embodiment in which the beam 1' is rotatable about pivot 3 between extreme positions defined by stops 61, secured at the end of a curved member 51, adapted to be towed by a tractor. The stops 61 may be positionable at alternative positions, for example one of which alternative positions is shown at 60, in order to limit the extent through which the beam 1' may be rotated and thus to vary the width of furrows being ploughed. As will be appreciated, there needs to be a greater length of beam nearer the tractor than spaced from the tractor beyond the pivot 3 in order to ensure that there is a greater drag on the portion of the beam 1' near the tractor such that the beam will be held against the stop 61 by the drag of the various ploughing apparatus.

While not shown in the drawings, the ploughs will be provided with conventional supporting wheels which will normally run on the ground and the vertical position of which in relation to the rest of the plough can be adjusted so as to control the depth of ploughing.

The pivot connections may comprise shear bolts so that if any one of the ploughing apparatus hits a completely immovable obstruction, rather than being destroyed, the shear bolt will shear to leave the ploughing apparatus virtually undamaged with the tractor and beam and non-snagged ploughing apparatus being allowed to continue.

I claim:

1. An agricultural plough comprising:

a frame means having a first portion adapted to be drawn by or mounted to a tractor and a second portion comprising a beam pivotally connected to said first portion so as to be alternatively pivotally positionable for left- and right-handed ploughing relative to a forward ploughing direction;

a plurality of tilling apparatus, each tilling apparatus comprising a rotary tilling implement, a point for penetrating soil forwardly of a leading edge of said tilling implement and a landslide extending rearwardly from said point beneath and to the rear of said tilling implement; and a plurality of frames, each said frame carrying a respective one of said plurality of tilling apparatus and being pivotally connected to said beam by a respective pivot connection normally to trail rearwardly from said beam in alignment parallel to the forward ploughing direction and, when an obstruction in the soil is encountered by the tilling apparatus carried thereby, to be displaceable laterally relative to the other ones of said frames by pivoting around said pivot connection;

wherein each said rotary tilling implement is in the form of a plough disc or soil inversion wheel with said tilling implement being mounted for rotation about a substantially horizontal shaft which itself is pivotable about its end remote from said tilling implement for reversing the inclination of said tilling implement relative to the forward ploughing direction and its carrying frame for changing the arrangement between right- and left-ploughing.

2. A plough according to claim 1, wherein the pivot axis of each said pivot connection extends in front of the leading part of the tilling apparatus towed from such pivot connection.

3. A plough according to claim 2, wherein the axis of the pivot connection from the beam to the tilling apparatus is inclined to the vertical in order to extend downwardly and forwardly away from the plough.

4. A plough according to claim 1, including means by which the amount of inclination of the beam may be controlled to control lateral spacing of the tilling apparatus and thus furrow spacing during ploughing.

5. A plough according to claim 1, wherein means are provided for limiting the angle of pivoting of at least one of the tilling apparatus relative to the beam to limit the inclination of the beam relative to the direction of ploughing.

6. A plough according to claim 5, wherein the means for limiting the angle of pivoting is an adjustable stop, adjustment of which indirectly controls the amount of inclination of the beam to control lateral spacing of the tilling apparatus and thus furrow spacing during ploughing.

* * * * *

UNITED STATES PATENT AND TRADEMARK OFFICE
CERTIFICATE OF CORRECTION

PATENT NO. : 5,454,434
DATED : October 3, 1995
INVENTOR(S) : Peter D. T. Topham

It is certified that error appears in the above-indentified patent and that said Letters Patent is hereby corrected as shown below:

On the title page: Item [19]  "Temple" should be --Topham--.

Item [75]  ; "Temple" should be --T. Topham--.

Item [75]  , line 3, "4Xq" should be --4XQ--.

Item [56]  - Attorney, Agent, or Firm, "Harness, Dickey & Pierce" should be --Harness, Dickey & Pierce, P.L.C.--.

Signed and Sealed this

Sixteenth Day of January, 1996

Attest:

BRUCE LEHMAN

Attesting Officer  Commissioner of Patents and Trademarks